US006678838B1

(12) United States Patent
Magro (10) Patent No.: US 6,678,838 B1
(45) Date of Patent: Jan. 13, 2004

(54) METHOD TO TRACK MASTER CONTRIBUTION INFORMATION IN A WRITE BUFFER

(75) Inventor: James R. Magro, Austin, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

(21) Appl. No.: 09/379,013

(22) Filed: Aug. 23, 1999

(51) Int. Cl.$^7$ ............................................. G06F 11/00
(52) U.S. Cl. ........................ 714/42; 710/310; 711/147
(58) Field of Search ................................. 711/147, 144; 714/27, 30, 37, 42, 43; 710/110, 308

(56) References Cited

U.S. PATENT DOCUMENTS

| 4,538,226 A | | 8/1985 | Hori ............................ 364/200 |
| 4,622,631 A | * | 11/1986 | Frank et al. ................. 707/201 |
| 4,646,298 A | * | 2/1987 | Laws et al. ................... 714/27 |
| 4,649,475 A | * | 3/1987 | Scheuneman ............... 711/149 |
| 4,750,154 A | | 6/1988 | Lefsky et al. ............... 365/189 |
| 4,920,539 A | * | 4/1990 | Albonesi ...................... 714/54 |
| 4,959,771 A | | 9/1990 | Ardini, Jr. et al. .......... 364/200 |
| 5,060,144 A | * | 10/1991 | Sipple et al. ................ 710/200 |
| 5,208,914 A | * | 5/1993 | Wilson et al. ................ 710/39 |
| 5,299,147 A | | 3/1994 | Holst ............................ 365/49 |
| 5,329,405 A | | 7/1994 | Hou et al. .................... 395/800 |
| 5,428,766 A | * | 6/1995 | Seaman ....................... 709/215 |
| 5,440,713 A | * | 8/1995 | Lin et al. ..................... 711/158 |
| 5,444,583 A | * | 8/1995 | Ehrlich et al. ............... 324/226 |
| 5,490,261 A | * | 2/1996 | Bean et al. ................... 711/121 |
| 5,551,005 A | * | 8/1996 | Sarangdhar et al. ........ 711/121 |
| 5,590,354 A | * | 12/1996 | Klapproth et al. ............ 714/30 |
| 5,615,402 A | | 3/1997 | Quattromani et al. ....... 395/800 |
| 5,627,993 A | | 5/1997 | Abato et al. ................. 395/470 |
| 5,649,209 A | * | 7/1997 | Umetsu et al. .............. 710/110 |
| 5,655,100 A | * | 8/1997 | Ebrahim et al. ............. 711/121 |
| 5,761,697 A | * | 6/1998 | Curry et al. ................. 710/107 |
| 5,809,228 A | | 9/1998 | Langendorf et al. ... 395/185.06 |
| 5,829,035 A | * | 10/1998 | James et al. ................. 707/201 |

(List continued on next page.)

FOREIGN PATENT DOCUMENTS

| EP | 0455946 A2 | * | 11/1991 | ............ G06F/11/00 |
| JP | 08249289 A | * | 9/1996 | ............ G06F/15/16 |

OTHER PUBLICATIONS

"Checkstop Architecture for a Multiprocessor System", Jan. 1, 1991, IBM Technical Disclosure Bulletin, vol. 33, iss. 8, pp. 321–323.*
"Logic Analyzer", Microsoft Press Computer Dictionary Third Edition, 1997, p. 289.*
"Program Storage Overlay Detection", IBM Technical Disclosure Bulletin, Mar. 1994, US, vol. 37, iss. 3, pp. 381–384.*
AMD–640™ System Controller Data Sheet, Advanced Micro Devices, Inc., ©1997, pp. 2–1 through 2–4, 5–1 through 5–3, 5–11, and 5–32.
Motorola Semiconductor Technical Data, Motorola, Inc., Doc. No. MCM69C432, Rev. 2, Sep. 15, 1997, pp. 1 through 20.

Primary Examiner—Robert Beausoliel
Assistant Examiner—Gabriel L Chu
(74) Attorney, Agent, or Firm—Akin Gump Strauss Hauer & Feld LLP (57) ABSTRACT

A write buffer includes master trace bits to enable a system debugger to determine the source of accesses to memory in systems with multiple masters. When a write to memory is initiated by one of a plurality of masters, the write buffer receives a grant signal, indicating which master is initiating the write operation, and stores the information as master trace bits. Likewise, when a read from memory is initiated by a master, the write buffer master trace bits reflect the requesting master. Accordingly, each rank in the write buffer may include master trace information. The master trace bits are particularly useful in write buffers which employ either write merging or write collapsing features. The master trace bits are further made available to system debuggers on pins external to the system or via a port accessible to software.

17 Claims, 5 Drawing Sheets

U.S. PATENT DOCUMENTS

| | | | | |
|---|---|---|---|---|
| 5,835,704 A | * | 11/1998 | Li et al. | 710/35 |
| 5,848,264 A | * | 12/1998 | Baird et al. | 703/28 |
| 5,860,112 A | | 1/1999 | Langendorf et al. | 711/143 |
| 5,970,246 A | * | 10/1999 | Moughani et al. | 711/1 |
| 6,009,528 A | * | 12/1999 | Teraoka | 713/201 |
| 6,021,261 A | * | 2/2000 | Barrett et al. | 714/37 |
| 6,044,477 A | * | 3/2000 | Jordan et al. | 714/39 |
| 6,085,295 A | * | 7/2000 | Ekanadham et al. | 709/214 |
| 6,119,254 A | * | 9/2000 | Assouad et al. | 714/724 |
| 6,151,658 A | * | 11/2000 | Magro | 711/110 |
| 6,163,826 A | * | 12/2000 | Khan et al. | 710/107 |
| 6,219,675 B1 | * | 4/2001 | Pal et al. | 707/1 |
| 6,317,847 B1 | * | 11/2001 | Haubursin et al. | 712/227 |
| 6,401,223 B1 | * | 6/2002 | DePenning | 714/42 |
| 6,546,439 B1 | * | 4/2003 | Strongin et al. | 710/52 |
| 2001/0001868 A1 | * | 5/2001 | Klein | 710/110 |

* cited by examiner

METHOD TO TRACK MASTER CONTRIBUTION INFORMATION IN A WRITE BUFFER

BACKGROUND OF THE INVENTION

1. Field of the Invention

This application relates to a memory buffer architecture, and more particularly to a buffer architecture with the capability to track master information.

2. Description of the Related Art

Many systems contain random access memory, or RAM, to provide temporary storage of data when a system is powered up. A source within the system, often known as a master, will typically read from the RAM or write to the RAM. To illustrate, a processor in a system may be a master. (Because a master must have control of a bus which connects between the master and the RAM in order to access the RAM, the master is also commonly known as a bus owner or bus master during the time.) Also found in many systems is an interface to the memory, or RAM, known as a RAM, controller. So, for example, in a system using dynamic RAM, or DRAM, a DRAM controller may interface between the master and the DRAM itself.

DRAM controllers, as well as other types of memory controllers, may contain a component or mechanism known as a write buffer. Write buffers permit a master to post writes to the DRAM without incurring DRAM latency penalty. Latency refers to the period of time that one component in a system is waiting for another component. Essentially then, latency is wasted time. In a typical system, a master can send data to the DRAM faster than the DRAM can receive the data from the master. The presence of a write buffer in a DRAM controller, therefore, eliminates the latency problem by permitting the master to send a write to the DRAM without having to wait for the DRAM to actually receive the writes. The write buffer, as intermediary between the master and the DRAM, receives write data from the master, and then forwards the write data to the DRAM, freeing up the master to perform other operations.

Some systems include multiple entities which may perform reads from and writes to DRAM. These systems can thus be said to contain multiple masters. The write buffer in the DRAM controller can, at any given moment, potentially contain write data (to be stored in the DRAM) that came from multiple masters.

When debugging a system that uses multiple masters, identifying the source of DRAM write cycles from the DRAM interface has been difficult or infeasible. A developer who is debugging a system typically attaches a logic analyzer to the DRAM interface, in order to "see" what is being written to or read from the DRAM. In the case of writes to DRAM, the write buffer, as opposed to the originating master, appears to be the "source" of write data to the DRAM. The absence of master information during writes to DRAM has frustrated effective system debug. This frustration is particularly acute in systems with many masters.

SUMMARY OF THE INVENTION

Briefly, the illustrative system provides a write buffer containing master trace bits which enable a system debugger to determine which master wrote to system memory. The master trace or master contribution bits of the write buffer can be coupled to pins which are externally accessible to a system debugger. For example, in a microcontroller architecture, in which system memory, or DRAM, a DRAM controller, and one or more masters are all part of the microcontroller, the master trace bits are coupled to a plurality of the microcontroller pins. For systems in which the memory, DRAM controller, and masters are discrete components, the master trace bits of the write buffer may instead be coupled to pins on the DRAM controller.

The external pins identify contributing master information during a write buffer write cycle to DRAM. In addition to address tag and byte valid bits, the write buffer includes master trace bits for tracking this master information. When write data intended for the DRAM is sent by a master to the write buffer, a master trace bit is set which associates the data in a data store of the write buffer to the master which provided the data. These master trace bits are each associated with a master which writes to the DRAM.

The master trace bits are coupled to pins which are external, meaning the pins are accessible to a system debugger. So, in a microcontroller architecture, the master trace bits may be coupled to the microcontroller pins themselves. Using a logic analyzer or other debug tool which connects to these external pins, the debugger can then identify which master wrote to DRAM at a particular address. That is, the external pins help to identify which master or bus owner contributed to the current DRAM write cycle. In some cases, more than one master can be a contributor of a particular DRAM write cycle, a condition which is explained in further detail, below. Alternatively, the external pins identify which master (or bus owner) is requesting the current DRAM read cycle. In the case of a read request, only a single master is involved for a particular DRAM read cycle.

In one embodiment, a microcontroller includes a DRAM, a DRAM controller which includes the illustrated write buffer, and three possible bus masters: a central processing unit, or CPU, a peripheral component interconnect, or PCI, bus master, and a direct memory access, or DMA, controller. For this embodiment, three pins are provided to indicate whether the CPU, the PCI bus master, the DMA controller, or a combination of these three masters, has written into a particular location of the write buffer.

In the illustrative embodiment, the trace information of the external pins is available a full clock before the clock edge where the command (either read or write) is driven to the DRAM. This timing parameter facilitates reliable tracking of the master write to DRAM for the system debugger.

BRIEF DESCRIPTION OF THE DRAWINGS

A better understanding of the illustrative system can be obtained when the following detailed description of the disclosed embodiment is considered in conjunction with the following drawings, in which.

DETAILED DESCRIPTION OF PREFERRED EMBODIMENT

A patent describes a write buffer FIFO architecture and some particular features of that architecture in commonly assigned U.S. Pat. No. 6,151,658, entitled "WRITE-BUFFER FIFO ARCHITECTURE WITH RANDOM ACCESS SNOOPING CAPABILITY" to James R. Magro, filed on Jan. 16, 1998, which is hereby incorporated by reference as if set forth in its entirety.

The illustrative system described in this patent application provides a technique for determining the source of memory writes in a system which contains multiple masters. For purposes of explanation, specific embodiments are set forth to provide a thorough understanding of the illustrative system. However, it will be understood by one skilled in the art, from reading the disclosure, that the technique may be practiced without these details. Further, although the embodiments are described in terms of a microcontroller architecture, it should be understood that this embodiment is illustrative and is not meant in any way to limit the practice of the disclosed system to microcontroller systems. Also, the use of the terms DRAM and DRAM controllers to illustrate how the system works is not intended to infer that the illustrative system requires a specific type of memory. Rather, any of a variety of memory types may be employed in practicing the technique described herein. Moreover, well-known elements, devices, process steps, and the like, are not set forth in detail in order to avoid obscuring the disclosed system.

Figure 1:
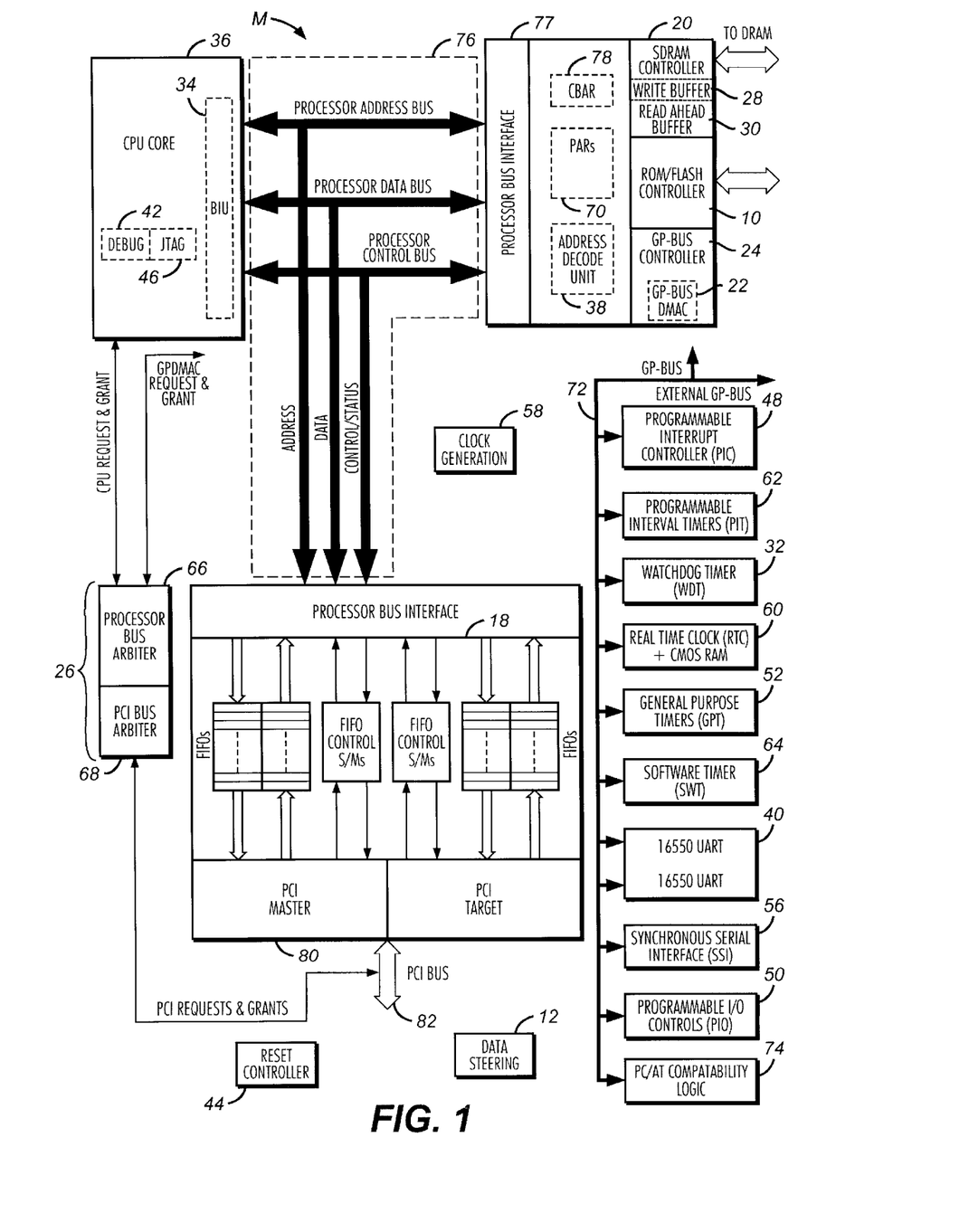
FIG. 1 is a block diagram of some elements (including a write buffer and a DRAM controller) of an exemplary microcontroller according to one embodiment.

Turning now to the drawings, FIG. 1 shows a typical microcontroller M in accordance with the present invention. The microcontroller M provides a highly integrated CPU 36 with a complete set of peripherals that are superset of common PC/AT peripherals and with a set of memory mapped peripherals. In the disclosed exemplary embodiment, the CPU 36 is the Am5x86 CPU core, which utilizes the industry standard x86 microprocessor instruction set. The CPU 36 includes an integrated 16K write back cache.

The microcontroller M provides Programmable Address Region (PAR) registers 70 that enable flexible placement of memory and peripherals into a memory address space and an I/O address space. The PAR registers 70 also allow control of important attributes like cacheability, write protection, and code execution control for memory resources. Both the PAR registers 70 and a Configuration Base Address register (CBAR) 78 serve as address decode registers. While the PAR registers 70 are memory-mapped, the CBAR 78 is direct-mapped to I/O.

An address decoding unit (ADU) 38 provides flexible distributed memory and I/O address decode logic. Address decode is distributed between a general purpose (GP)-Bus Controller 24, memory controllers such as a read-only memory (ROM) controller 10 and a dynamic random access memory (DRAM) controller 20, and a Peripheral Component Interconnect (PCI) bus 82. PC/AT-compatible peripherals are direct-mapped to I/O, and remaining integrated peripherals are memory-mapped. The memory space and I/O space of a general purpose bus 72 are accessible by the CPU 36, the PCI master controller 80, and external PCI bus masters. The memory space and I/O space of the PCI bus 82 are accessible by the CPU 36 and PCI masters on the PCI bus 82.

A system arbiter 26 includes an arbiter 66 for performing arbitration for a processor bus 76 (shown divided into its address, data, and control portions) and an arbiter 68 for performing arbitration for the PCI Bus 82. The processor bus arbiter 66 may arbitrate between several possible processor bus masters. For example, the processor bus arbiter 66 may handle requests for the CPU 36, the general purpose bus DMA controller 22, and the PCI host bridge 18 on behalf of an external bus master requesting access to DRAM, and a PCI host bridge 18 (on behalf of a master on the PCI bus 82). The PCI bus arbiter 68 may arbitrate between five possible PCI masters in the disclosed embodiment.

A processor bus interface 78 is responsible for DMA cache snooping, dynamic clock speed adjusting, dynamic bus sizing, ready signal consolidation, Memory Mapped Configuration Region (MMCR) control, and general purpose address control. A bus interface unit, or BIU, 34 basically assists the CPU 36 with bus, DMA, and memory control.

A clocks module 58 provides oscillators and phase locked loops (PLLs) to support the DRAM controller 20, UARTs 40, general purpose timers (GPT) 52, and a real-time clock (RTC) 60.

The DRAM controller 20 provides SDRAM (synchronous DRAM) support, symmetric and asymmetrical DRAM support, SDRAM auto refresh support, SDRAM Error Correction Code (ECC) support, DRAM write buffering support, DRAM read pre-fetching support, read buffer support, read-around-write support, and supports up to 256 megabytes of DRAM. The DRAM controller 20 may service requests from the CPU 36, the PCI host bridge 18 (on behalf of a PCI master), or the general purpose bus DMA controller and issues commands to SDRAM devices. DRAM cycles may also be initiated by a write buffer 28 or a read-ahead buffer 30 internal to the DRAM controller 20. The write buffer 28 and the read-ahead buffer 30 together provide buffering techniques to optimize DRAM system performance.

A data steering block 12 stores data and routes data as needed from 8/16-bit devices from/to the general purpose bus 72 to/from a CPU bus. On DMA SDRAM reads, the data steering block 12 may save data until the next address strobe.

A general purpose bus controller 24 controls the general purpose bus 72, an internal and external bus that connects 8- or 16-bit peripherals to the microcontroller M without glue logic. Features of the controller 24 include 8 external chip selects, programmable bus interface timing, "ready" signal support for external devices, and support for 8/16-bit I/O and memory mapped I/O cycles. In the disclosed embodiment, the general purpose bus 72 supports a programmable interrupt controller (PIC) 48, a programmable interval timer (PIT) 62, a watchdog timer (WDT) 32, the real-time clock (RTC) 60, the general purpose timers (GPT) 52, a software timer (SWT) 64, UARTs 40, a synchronous serial interface (SSI) 56, programmable I/O logic 50, and PC/AT compatibility logic 74.

The microcontroller M includes a DMA controller 22 (general purpose bus DMAC) on the general purpose bus 72. The controller 22 is shown integrated with the general purpose bus controller 24. The DMA controller 22 is designed to handle any DMA accesses between general purpose bus peripherals (internal or external) and DRAM. Features of the controller 22 includes support for up to 7 DMA request channels (with a maximum of 4 external requests), support for three 16-bit channels and four 8-bit channels, buffer chaining capability in enhanced mode, fly-by (single cycle) transfers between general purpose bus peripherals and DRAM, and variable clock modes. The controller 22 is PC/AT-compatible.

A PIO (programmable I/O) unit 50 provides PIO logic to support 32 programmable I/O signals (PIOs) to monitor signals and control devices not handled by other functions of the microcontroller M. The PIOs are shared with other functions on the microcontroller M.

A timers unit 52 provides general purpose timers for generic timing or counting applications. Features of the timers unit 52 include three 16-bit timers, two-stage cascading of timers, and several modes of operations.

An in-circuit emulator (ICE) core 42 provides an integrated debug interface for embedded hardware/software debug during a special debug mode, ICE mode. Controllability and observability may be achieved through a fast JTAG-compliant serial interface.

A PCI host bridge 18 is integrated into the microcontroller M which allows the CPU 36 to generate PCI master transactions and allows external PCI masters to access the microcontroller DRAM space. The PCI Host bridge 18 may be a 33 MHz, 32-bit PCI Bus Revision 2.2-compliant host bridge interface.

A PIC 48 includes 3 industry standard programmable interrupt controllers (PICs) integrated together with a highly programmable interrupt router. Two of the PICs 48 may be cascaded as slaves to a master PIC which arbitrates interrupt requests from various sources to the CPU 36. The PICs 48 may be programmed to operate in PC/AT-compatible mode. The router may handle routing of 33 various external and internal interrupt sources to the 22 interrupt channels of the three PICs.

A programmable interval timer (PIT) 62, which is compatible to 8254 PIT circuitry, is provided. The PIT 62 provides three 16-bit general purpose programmable channels, six programmable counter modes, and binary and BCD counting support.

The microcontroller M further includes an integrated reset controller 44 to control the generation of soft or hard resets to the CPU 36 and system resets to the various internal cores. The reset controller 44 provides a control bit to enable ICE mode after the CPU 36 has been reset.

An integrated ROM/Flash controller 10 provides a glueless interface to up to three ROMs, EPROMs, or flash devices. It supports asynchronous and advanced page-mode devices.

The RTC block 60 is compatible with the Motorola MC 146818A device used in PC/AT systems. The RTC 60 supports binary or BCD representation of time, calendar, and alarm, its own power pin and reset, 14 bytes of clock and control registers, 114 bytes of general purpose RAM, three interrupts sources, battery backup capability, and an internal RTC reset signal to perform a reset at power-up.

A synchronous serial interface (SSI) 56 provides efficient full-duplex and half-duplex, bi-directional communications to peripheral devices. Other features include clock speed programmable from 64 KHz to 8 MHz and multiple device enables.

A software timer (SWT) 64 is a peripheral on the GP-Bus 72 which provides a millisecond time base with microsecond resolution timing for software. The peripheral 64 includes a 16-bit millisecond up counter and a 10-bit millisecond up counter.

A test controller block 46 includes test logic such as the JTAG controller. The test logic is provided to test and ensure that the components of the microcontroller M function correctly.

A UART block 40 includes two PC16550-compatible UARTs, both capable of running 16450 and 16550 software. The UART block 40 supports DMA operation, a FIFO mode, an internal baud rate clock to handle baud rates up to 1.5 M bits/s, false start bit detection, break detection, full-duplex operation, and other features.

A watchdog timer block (WDT) 32 is a mechanism to allow system software to regain control of the microcontroller M when the software fails to behave as expected. The watchdog timer block 32 supports up to a 30-second timeout with a 33 MHz CPU clock.

The PC/AT compatibility logic 74 provides PC/AT-compatible functions. The PC/AT compatible integrated peripherals include the DMA controller 22, the PIT 62, the PIC 48, the GPT 52, the UARTs 40, and the RTC 60.

This particular microcontroller is merely illustrative. The techniques and circuitry according to the invention could be applied to a wide variety of microcontrollers and other similar environments. The term "microcontroller" itself has differing definitions in industry. Some companies refer to a processor core with additional features (such as I/O) as a "microprocessor" if it has no onboard memory, and digital signal processors (DSPs) are now used for both special and general purpose controller functions. As here used, the term "microcontroller" covers all of the products, and generally means an execution unit with added functionality all implemented on a single monolithic integrated circuit.

Figure 2:
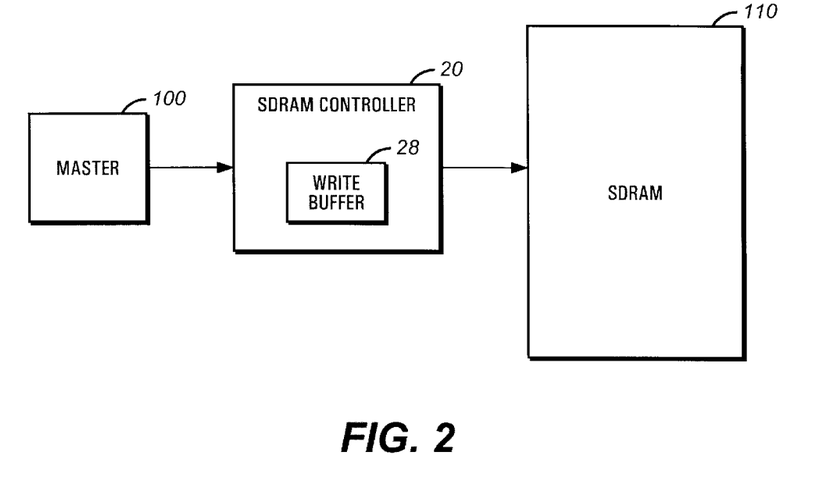
FIG. 2 is a simple block diagram of a DRAM controller with a write buffer coupled between a master and a DRAM.

As FIG. 1 illustrates, DRAM controllers such as DRAM controller 20 typically include write buffers, such as write buffer 28, so that a master, such as CPU 36, can post writes to the DRAM without incurring any timing penalties, commonly known as wait states, due to latency. FIG. 2 depicts a simplified system of some of the components shown in FIG. 1. The system of FIG. 2 includes an SDRAM controller 20 with a write buffer 28 interfacing between a master 100 and the memory 110, illustrated as synchronous DRAM, or SDRAM 110. In this system, as in many, the write buffer 28 may be enabled or disabled.

When the master 100 initiates a write to DRAM 110, if the write buffer 28 is enabled, the write buffer 28 receives the data intended for the DRAM 110 and quickly fills up its ranks with the data. (The write buffer 28 is described in more detail, below, in conjunction with the description of FIG. 4.) The use of the write buffer 28 ideally releases the master 100 from the write operation more quickly than direct writes to DRAM 110, enabling the master 100 to conduct other operations not associated with the DRAM 110.

Figure 3:
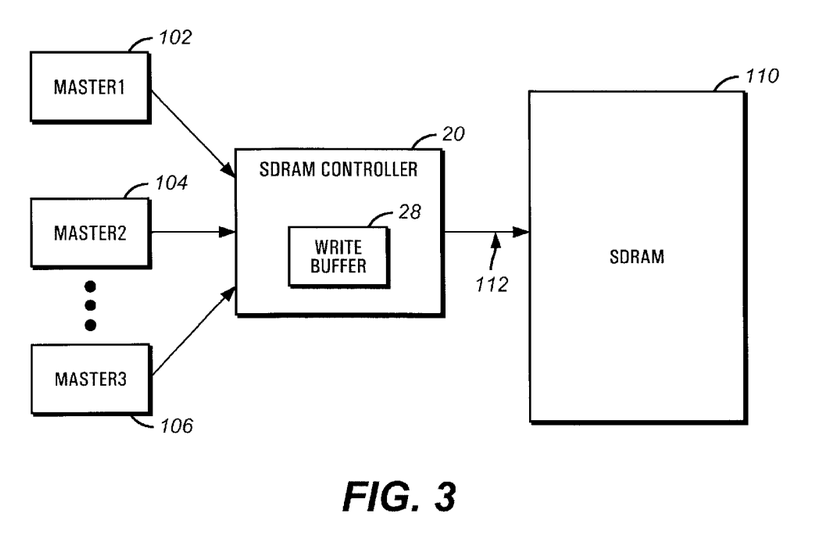
FIG. 3 is a simple block diagram of a DRAM controller with a write buffer coupled between multiple masters and a DRAM.

Some systems may have more than one master. FIG. 3 shows a system with multiple masters, each with the ability to write to the DRAM 110. As with FIG. 2, an SDRAM controller 20 is coupled between a plurality of masters 102, 104, and 106 and the SDRAM 110. Ellipses in FIG. 3 are shown to represent that the system may include more than the three masters 102, 104, and 106 shown. Between the DRAM controller 20 and the DRAM 110 itself is an interface 112.

When debugging a system, one of the components which may be monitored is the DRAM 110. Typically, a logic analyzer is connected to the interface 112 to the DRAM 110. As FIG. 3 shows, because the write buffer 28 essentially "intercepts" writes to DRAM 110, for purposes of improving system throughput, the source of the writes to DRAM 110 is lost. In a system such as the one depicted in FIG. 2, the interception of DRAM writes by write buffer 28 is not problematic because there is only a single master 100 in the system. However, for systems such as the one depicted in FIG. 3, where multiple masters 102, 104, and 106 may be present, the source of a write to DRAM 110 has eluded conventional system architectures.

U.S. Pat. No. 6,151,658 entitled "WRITE-BUFFER FIFO ARCHITECTURE WITH RANDOM ACCESS SNOOPING CAPABILITY", which is incorporated into this document, describes a particular write buffer in detail. Briefly, however, simple write buffers are FIFO (first-in-first-out) devices which receive data in at one end and send data out at the other end. Essentially a temporary storage mechanism, write buffer FIFOs may be also implemented as "circular queue" FIFOs, which include pointers for reading from and writing to the circular queue of the FIFO. These circular queue FIFOs may, for example, contain an address store and a data store. The address store keeps track of the intended DRAM address for the write data, while the data store is a mechanism for storing the write data itself. The address and data stores are measured in) ranks, which are units of the write buffer FIFO Further, the write buffer provides write collapsing and write merging capability, discussed in more detail below. Although this particular embodiment of a write buffer is described herein, it should be appreciated that other buffer architectures for tracking master information are possible.

Figure 4:
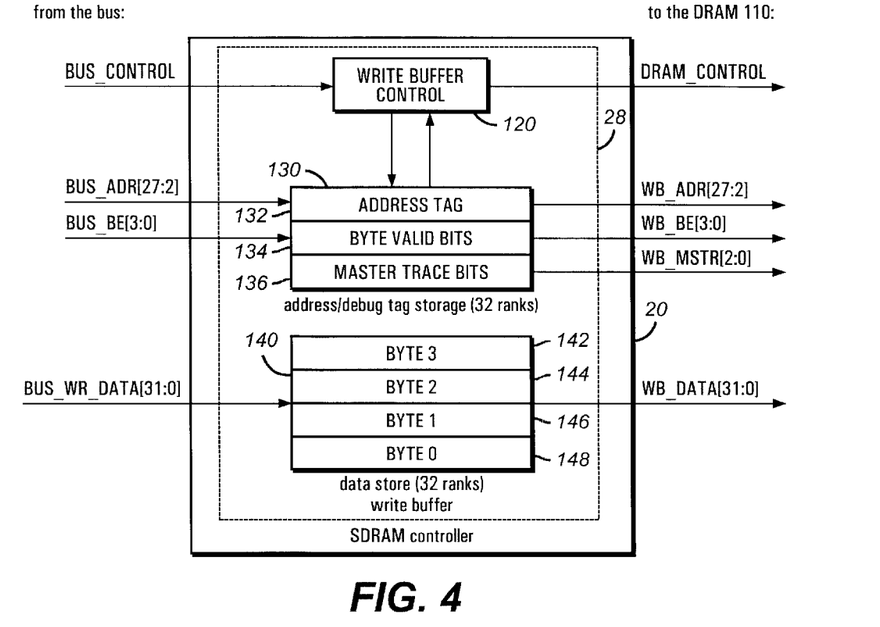
FIG. 4 is a block diagram illustrating some of the components of the write buffer of FIG. 1 according to one embodiment.

FIG. 4 illustrates a write buffer 28 architecture according to one embodiment. As in the previous figures, the write buffer 28 is part of the DRAM controller 20. Shown at the left side of FIG. 4, signals come into the DRAM controller from a bus, which is part of the system or microcontroller. Signals on the right side of FIG. 4 exit the DRAM controller 20 and are intended to reach the DRAM 110 itself.

The write buffer 28 includes a write buffer control mechanism 120, which controls the operation of the write buffer 28. For example, the write buffer control mechanism 120 may include a load controller, a fetch controller, a read pointer controller, and a write pointer controller (not shown). FIG. 4 further depicts an address/debug store 130, which contains an address tag 132, some byte valid bits 134, and some master trace bits 136. In the disclosed embodiment, the address/debug store 130 includes such storage for 32 ranks of DRAM addresses.

The write buffer 28 also includes a data store 140. While the address/debug store 130 contains 32 ranks of DRAM addresses, the data store 140 contains storage for 32 ranks of DRAM write data. The data store 140 contains 32 ranks of four bytes in each rank 142, 144, 146, and 148. For each rank of write data stored in the data store 140, an associated address tag 132, byte valid bits 134, and master trace bits 136 is contained in the address/debug store 130.

As described in further detail, below, the master trace bits 136 in the write buffer 28 are employed to keep track of which (one or more) of a plurality of masters wrote to a particular rank of the write buffer 28. By coupling the master trace bits 136 to other logic in the system which is externally accessible to a system debugger, these bits 136 assist in identification of which master contributed to a particular rank of the write buffer 28 during a write buffer DRAM write cycle.

The master trace bits 136 may be coupled to external pins, either of a microcontroller in a microcontroller architecture, or to a DRAM controller in a system with discrete components on a system board, either of which are then accessible to a logic analyzer, for example. Alternatively, the master trace bits 136 may be coupled to a debug port or other mechanism which provides access to the master trace or contribution information using software retrieval. For example, an I/O or memory-mapped port, from which the CPU 36 can "read" the master trace bits directly, may readily be part of the design of the microcontroller M. System designers of ordinary skill will appreciate that these master trace bits 136 may be coupled in a variety of ways such that they are accessible for purposes of debugging a system.

Figure 5:
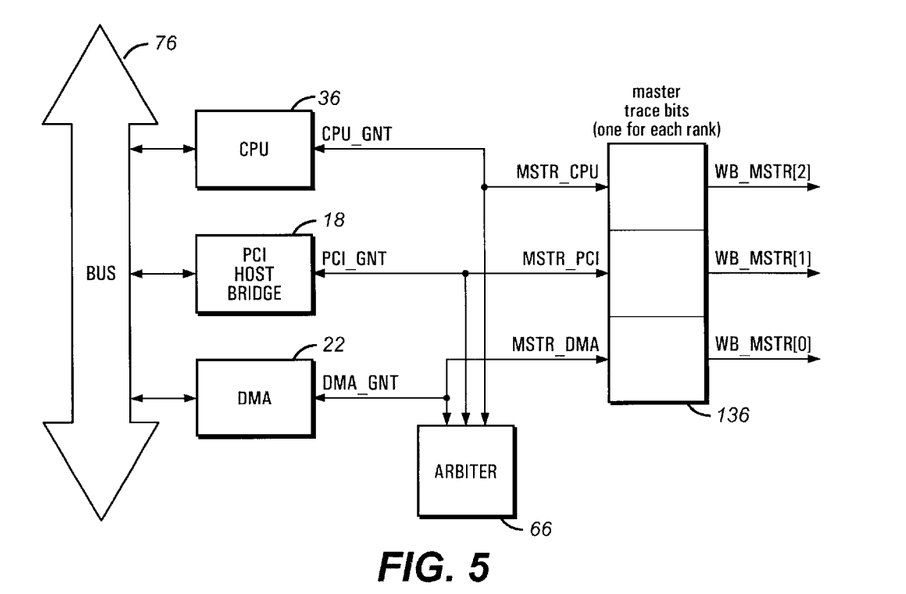
FIG. 5 is a block diagram illustrating how the master trace bits of the write buffer of FIGS. 1 and 4 are coupled to master signals in order to provide trace information during system debug.

FIG. 5 provides a more detailed illustration of the master trace bits 136, shown in FIG. 4. FIG. 5 first shows a bus 76 which is coupled to three masters. The bus 76 corresponds to the X5 bus 76 shown in FIG. 1. Coupled to the bus are three masters in FIG. 5: a CPU master 36, a PCI host bridge 18, and a DMA master 22.

FIG. 5 also shows the arbiter 66, first introduced in FIG. 1, which grants access to the bus 76 by providing grant signals (CPU_GNT, PCI_GNT, and DMA_GNT) to any one of the three masters shown. FIG. 5 shows that the arbiter 66 and the CPU 36 are coupled such that the CPU 36 may receive a CPU_GNT signal from the arbiter 66 whenever the CPU 36 may gain control of the bus 76. Likewise for the PCI host bridge 18 and the DMA master 22, the arbiter 66 sends PCI_GNT and DMA_GNT signals, respectively, for giving bus control to these masters.

The master trace bits 136, introduced in conjunction with the description of FIG. 4, are coupled to these grant signals between the possible bus masters and the arbiter 66. Thus, FIG. 5 shows that one bit of the master trace bits 136 is coupled to the CPU grant signal CPU_GNT, also shown as a MSTR_CPU input to a bit of the master trace bits 136. Likewise, the PCI_GNT signal is shown as a MSTR_PCI input to a second bit of the master trace bits 136, and the DMA_GNT signal is shown as a MSTR_DMA input to a third bit of the master trace bits 136. MSTR_CPU, MSTR_PCI, and MSTR_DMA basically serve as master contribution signals derived from the grant signals.

Although the disclosed embodiment shows a dedicated master trace bit for each master in the system, other configurations of master trace bits is possible. For example, in a system with only two masters, a single master trace bit could be contained in the write buffer such that its meaning is encoded. A "1" or high state in the master trace bit may be used to indicate that one master conducted the memory operation, while a "0" or low state in the master trace bit indicates that the second master conducted the memory operation.

The master trace bits may also be encoded in other ways. For example, master_0=0001b, master_1=0010b, master_2=0011b, etc., wherein a binary value, rather than a bit, represents a single master, is another possible implementation. For systems with several masters, encoding the master trace bits may be desirable, particularly when the available register bits are sparse. For the disclosed embodiment, one bit is dedicated for each master because of the write merging/collapsing capability of the write buffer 28.

The output of the master trace bits 136 can be termed "write buffer master bits." Thus, a first output, corresponding to the MSTR_CPU input, is shown as WB_MSTR[2]. A second output, corresponding to the MSTR_PCI input, is called WB_MSTR[1], and a third output, corresponding to the MSTR_DMA input, is called WB_MSTR[0]. These outputs are connected to external pins, either on the microprocessor M or on some other externally accessible component of the system, to facilitate debug of the DRAM 110.

In the disclosed embodiment, WB_MSTR[2:0] are terminated at three pins of the microcontroller M. However, these three pins may be used for other functions, not related to the write buffer 28. That is, the pins may be shared. Accordingly, the microcontroller M of the disclosed embodiment provides a "write buffer test mode" which, when enabled, causes the three pins herein described to reflect the signal values of WB_MSTR[2:0]. When write buffer test mode is disabled, the three pins may be used for other purposes by the microcontroller M.

In the disclosed embodiment, the write buffer 28 supports two features known as write collapsing and write merging. Write merging enables separate DRAM write cycles, which are intended to go to the same DWORD address, to essentially be "merged" into the same rank of the write buffer 28 before the actual write to DRAM takes place. Write merging improves efficiency by reducing the total number of DRAM write cycles that are necessary to accomplish the intended write to DRAM.

Write collapsing permits multiple writes, again to the same DRAM address, to be "collapsed" in the write buffer prior to being written to DRAM. When multiple writes to the same DWORD address are made, write collapsing permits the write buffer 28 to overwrite the "stale" write data prior to performing the write to DRAM. Both write merging and write collapsing optimize DRAM performance by reducing the number of individual writes to DRAM. More details about these intelligent functions can be found in entitled "WRITE-BUFFER FIFO ARCHITECTURE WITH RANDOM ACCESS SNOOPING CAPABILITY," which is incorporated into this document.

The use of the master trace bits to track master write information is particularly useful for write buffers which perform write merging and write collapsing. As a result of either write merging or write collapsing, multiple masters may contribute to a single rank. For example, a write buffer write to DRAM 110 of a single DWORD (4bytes) may be due to one byte from the CPU 36, 2 bytes from the general purpose DMA controller 22, and one byte from the PCI host bridge 18, as a result of write merging.

In the case of write collapsing, the CPU 36 may write a DWORD to a rank. Subsequently, the PCI host bridge 18 may write over that DWORD. The master trace bits are "accumulated" such that both the CPU 36 and the PCI host bridge 18 bits are set. This is so even though the PCI host bridge 18 write occurred last, totally overwriting the previously written CPU data. Thus, the master trace bits provide a history, indicating that the CPU 36 wrote to a rank and a PCI host bridge 18 write occurred to the same rank (or vice-versa).

During the write merge or write collapse operations, there are no dependencies between any DWORD that is in the write buffer 28 and any of the masters that are capable of posting data to the write buffer 28. This implies that multiple masters may contribute to the merging or collapsing of any DWORD in the write buffer 28 before the DWORD gets written to the DRAM 110. Thus, when debugging DRAM write cycles using the WB_MSTR[2:0] signals, it is possible for more than one signal to be active at a time. The presence of multiple active WB_MSTR signals indicates that multiple masters contributed to the current DWORD write. While a DWORD write is described in connection with the write buffer 28, it should be understood that the size of the write data provided to the write buffer 28 and the size of each rank in the write buffer 28 can vary.

Because multiple masters may contribute to a single rank using either the write collapsing or the write merging operations, the encoding of the master trace bits, discussed above, may not represent an optimal solution. However, for some implementations of a write buffer, encoding the master trace information should be considered.

Table 1 shows how the external pins WB_MSTR[2:0] pins are deciphered or interpreted by a debugger, according to one embodiment. Table 1 is the pin definition for write buffer write cycles to the DRAM 110 when the write buffer test mode is enabled.

As Table 1 shows, WB_MSTR[2:0] pins can indicate whether the CPU 36, the PCI host bridge 18 (on behalf of a PCI master), the DMA bus master 22, or a combination of these, has written into a particular rank of the write buffer 28. Accordingly, WB_MSTR[2] corresponds to the CPU master 36, WB_MSTR[1] corresponds to the PCI host bridge 18 (on behalf of a PCI master), and WB_MSTR[0] corresponds to the DMA bus master 22. Other associations of these pins with the masters are possible.

As with normal writes to the DRAM 110, the WB_MSTR[2:0] pins represent which bus masters contributed to the rank of the write buffer 28 which is being written to the DRAM 110.

TABLE 1

WB_MSTR[2:0] pin definition during write buffer write cycles

| WB_MSTR[2] | WB_MSTR[1] | WB_MSTR[0] | contributed write data: |
|---|---|---|---|
| 0 | 0 | 0 | reserved |
| 0 | 0 | 1 | DMA master |
| 0 | 1 | 0 | PCI master |
| 0 | 1 | 1 | DMA & PCI masters |
| 1 | 0 | 0 | CPU master |
| 1 | 0 | 1 | CPU & DMA masters |
| 1 | 1 | 0 | CPU & PCI masters |
| 1 | 1 | 1 | CPU, PCI, & DMA masters |

Table 2 describes the WB_MSTR[2:0] pin definition during DRAM read cycles. Although more than one of these bus masters may have written to a given rank in the write buffer 28, in the disclosed embodiment, only one master can read a rank at any given time. Thus, Table 2 shows that many of the configurations are reserved. Only configurations in which a single WB_MSTR pin is set are relevant during DRAM read cycles. During read operations, the master trace bits 136 reflect the master for any read cycle to the DRAM 110, not just for the read cycles that are in the write buffer rank at the time.

TABLE 2

WB_MSTR[2:0] pin definition during DRAM read cycles

| WB_MSTR[2] | WB_MSTR[1] | WB_MSTR[0] | contributed read data: |
|---|---|---|---|
| 0 | 0 | 0 | read prefetch cycle (no master) |
| 0 | 0 | 1 | DMA |
| 0 | 1 | 0 | PCI |
| 0 | 1 | 1 | Reserved |
| 1 | 0 | 0 | CPU |
| 1 | 0 | 1 | Reserved |

TABLE 2-continued

WB_MSTR[2:0] pin definition during DRAM read cycles

| WB_MSTR[2] | WB_MSTR[1] | WB_MSTR[0] | contributed read data: |
|---|---|---|---|
| 1 | 1 | 0 | Reserved |
| 1 | 1 | 1 | Reserved |

A noteworthy aspect of using the master trace bits is the case where a read prefetch operation takes place. If a read prefetch to DRAM occurs, the master trace bits read as '000', as Table 2 indicates. This is because no master is requesting the read of DRAM at that time. Instead, the prefetch circuitry is anticipating the fetch of the next memory location by one of the masters. For this reason, the read-ahead feature of the read buffer should be disabled when monitoring master trace information provided by the WB_MSTR[2:0] pins.

Figure 6A:
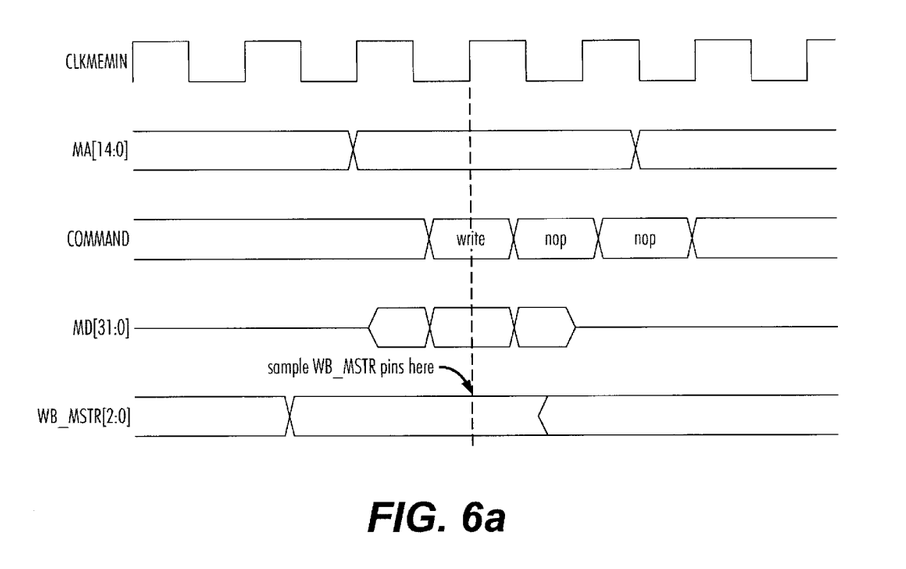
FIG. 6a is a timing diagram illustrating the optimum time for sampling the pins which provide master trace information during DRAM write cycles, according to one embodiment of the illustrative system.
Figure 6B:
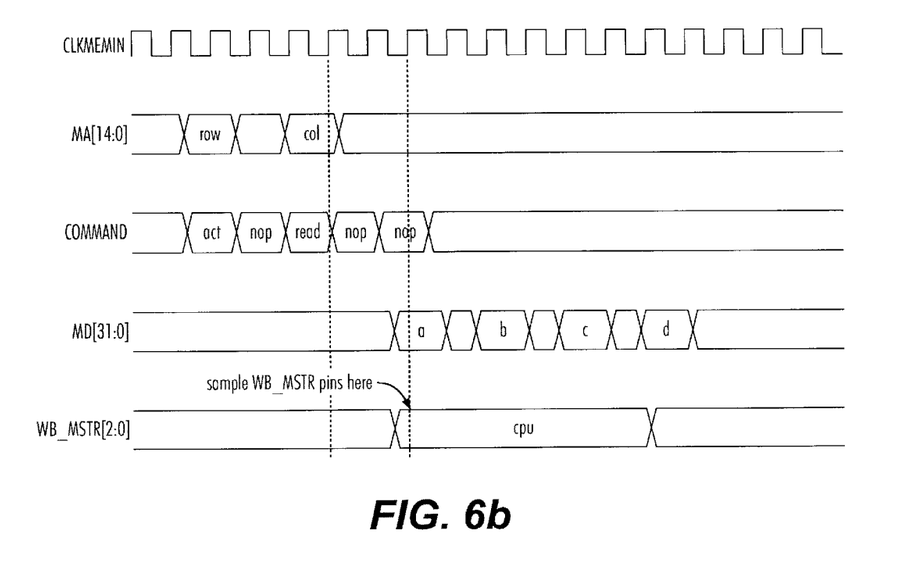
FIG. 6b is a timing diagram illustrating the optimum time for sampling the pins which provide master trace information during DRAM read cycles, according to one embodiment of the illustrative system.

Effective debug of DRAM read and write cycles requires that certain timing limitations are respected in order to obtain accurate information. Accordingly, the microcontroller M of the disclosed embodiment provides that, when write buffer test mode is enabled, the WB_MSTR[2:0] pins accurately reflect the master write information in a full clock prior to the clock edge where either a read cycle or a write cycle are driven to the DRAM 110. However, other implementations are possible, as long as the WB_MSTR[2:0] pins may reliably be sampled. FIGS. 6a and 6b illustrate the timing parameters for reliably tracking master information for DRAM write cycles and read cycles, respectively.

First, FIG. 6a illustrates the signal generation of the WB_MSTR[2:0] pins for write cycles to the DRAM 110, according to one embodiment. FIG. 6a is an example of a page hit DRAM write cycle during write buffer test mode. To capture the WB_MSTR[2:0] pins, the logic analyzer or other debugging equipment must decode the DRAM command and latch the WB_MSTR[2:0] pins on the rising edge of CLKMEMIN.

CLKMEMIN, shown in FIG. 6a, is a clock signal. Also shown is the memory address line, MA[14:0]. Further, the DRAM command is shown in FIG. 6a as COMMAND and the memory data as MD[31:0]. Finally, the master trace pins WB_MSTR[2:0] are shown. In the disclosed embodiment, the WB_MSTR[2:0] pins are available for sampling one full clock cycle prior to the command.

FIG. 6a shows a dotted line extended down from the rising edge of CLKMEMIN. Also shown is an arrow pointing to the master trace pins WB_MSTR[2:0], indicating where these pins may ideally be sampled in the disclosed embodiment. As stated above, the logic analyzer must decode the SDRAM command and latch these pins on the rising edge of CLKMEMIN, as shown.

Next, FIG. 6b illustrates the timing of a page miss SDRAM read cycle during write buffer test mode. To capture the master trace pins during a read cycle, the logic analyzer or other external system debugger must decode the SDRAM read command and delay latching the WB_MSTR2-WB_MSTR0 pins until the appropriate CAS latency timing is met. In the timing diagram of FIG. 6b, the CAS latency period is two clock cycles. Thus, FIG. 6b shows that, two full clock cycles after the read command is sampled by the DRAM, the data and the master trace bits are available for sampling.

As with the write cycle of FIG. 6a, the WB_MSTR[2:0] are captured on the rising edge of CLKMEMIN. In the disclosed embodiment, the CAS latency timing is configured in a DRAM timing register, contained in the DRAM controller 20, and is loaded into the SDRAM 110. The MA[14:0] bus may be used to determine the physical address generated by the requesting master.

Figure 7:
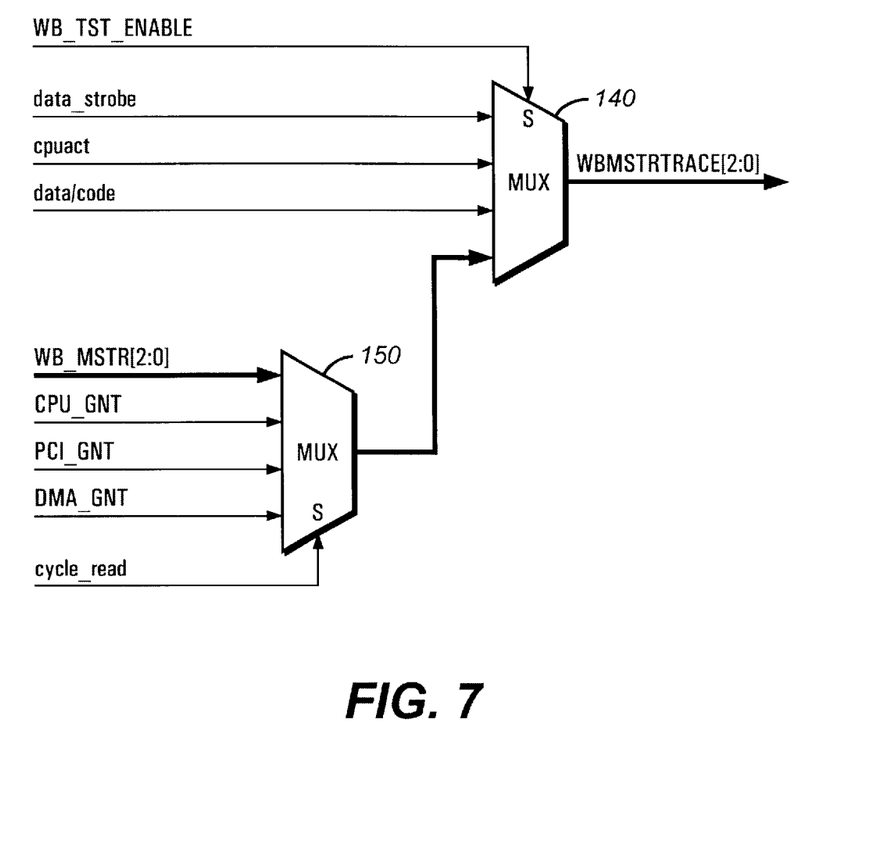
FIG. 7 is an illustration of the debug logic of the DRAM controller 20 according to one embodiment of the illustrative system.

In the disclosed embodiment, the microcontroller M shares the WB_MSTR[2:0] pins for either the system debug feature disclosed herein or other uses. Alternatively, the microcontroller M may provide dedicated pins for tracking master information during DRAM read and write cycles. FIG. 7 is a block diagram illustrating the debug logic of the DRAM controller 20 according to one embodiment. The top select signal WB_TST_ENABLE, when disabled, causes the output of a multiplexer 140 to reflect the non-write buffer trace signals for these three pins. In the disclosed embodiment, a data_strobe, a cpuact, and a data/code signals are all shown as inputs to the multiplexer 140. These signals represent the pin definition when the microcontroller M is not in write buffer test mode. The data_strobe signal indicates when data on the DRAM data bus is valid and can be latched on the rising edge of the CLKMEMIN signal. The cpuact signal indicates when an active read cycle was initiated by the processor 36. The data/code signal indicates whether the current memory read cycle is a code fetch or a data read.

The multiplexer 150 during reads directly selects between the master trace signals from the write buffer, shown as WB_MSTR[2:0], and the three grant signals, first introduced in FIG. 5: CPU_GNT, PCI_GNT, and DMA_GNT. A cycle_read signal comes from the DRAM controller 20 as the selector for the multiplexer 150. If a write buffer write operation is occurring, the master trace bits , WB_MSTR [2:0], coming from the write buffer 28 are selected by the multiplexer 150. Alternatively, when a read cycle is performed, the grant signals from the three masters, CPU_GNT, PCI_GNT, and DMA_GNT, are selected by the multiplexer 150.

When the WB_TST_ENABLE signal is enabled, the output from a second multiplexer 150 is selected as the output of the multiplexer 140. FIG. 7 thus illustrates a technique of multiplexing the master trace signals with the master grant signals as well as multiplexing these signals with the shared signals.

Thus, a write buffer with the capability to track master information during DRAM read and write cycles is disclosed. The master trace bits provide a useful tool for the system debugger in an environment where multiple masters may write to and read from memory. Although the disclosed embodiment provides these master trace bits in a write buffer, buffers other than write buffers may similarly employ this mechanism. For example, a read-ahead buffer may include master trace contribution information, as desired, to facilitate system debug, as shown in FIG. 2. Further, the disclosed technique to track master information can be employed within or in connection with a PCI bridge which includes a write buffer or other hardware logic which buffers writes to another device.

The capability to track master information is particularly useful due to the write merging and write collapsing features of the write buffer 28. The master trace bits show a history of writes to all ranks of the write buffer 28, rather than merely disclosing who was the last master.

The foregoing disclosure and description of the various embodiments are illustrative and explanatory thereof, and various changes in the type of memory, the descriptions of the microcontroller, the DRAM controller, the write buffer, the masters, and other circuitry, the organization of the components, and the order and timing of steps taken, as well as in the details of the illustrated system may be made without departing from the spirit of the invention.

I claim:

1. A microcontroller, comprising:

an internal bus;

a plurality of masters coupled to the internal bus;

a memory coupled to the internal bus;

a memory controller coupled to the internal bus and accessible by each of the plurality of masters, the memory controller comprising:

a buffer, coupled between the plurality of masters and the memory, comprising:

a plurality of master trace bits to designate which of the plurality of masters contributed data to the buffer.

2. The microcontroller of claim 1, further comprising:

a plurality of externally accessible master pins coupled to the plurality of master trace bits of the buffer.

3. The microcontroller of claim 1, wherein the plurality of master trace bits comprises a set of master trace bits on each rank in tie buffer to indicate which master of the plurality of masters contributed data to the corresponding rank.

4. The microcontroller of claim 1, wherein one of the plurality of masters is a processor.

5. The microcontroller of claim 1, wherein one of the plurality of masters is a peripheral component interconnect (PCI) bus master.

6. The microcontroller of claim 1, wherein one of the plurality of masters is a direct memory access (DMA) controller.

7. The microcontroller of claim 1, wherein the buffer is a write buffer.

8. The microcontroller of claim 1, wherein the plurality of master trace bits are coupled to grant signals associated with the plurality of masters.

9. The microcontroller of claim 1, wherein the master trace bits indicate that multiple masters contributed to a single rank.

10. A buffer to track master contribution information for a plurality of masters, the buffer coupled between the plurality of masters and a memory, comprising:

a plurality of ranks to contain data; and a plurality of master trace bits on each rank of the plurality of ranks to indicate which master of the plurality of masters contributed the data to the corresponding rank, wherein the buffer is a first-in-first-out (FIFO) buffer, and wherein the plurality of master trace bits are coupled to grant signals associated with the plurality of masters.

11. A method of determining which of a plurality of masters contributed data to a buffer coupled between a memory and the plurality of masters, the method comprising the following steps;

receiving data into the buffer;

examining grant signals of a master which originated the data; and storing master contribution information in the buffer to associate the master with the data, wherein the buffer is a first-in-first-out (FIFO) buffer.

12. The method of claim 11, further comprising the step of:

retrieving the master contribution information from the buffer with a logic analyzer.

13. The method of claim 11, further comprising the step of:

retrieving the master contribution information from the buffer with software via I/O or memory-mapped decoding.

14. The method of claim 11, wherein the buffer is a write buffer.

15. The method of claim 11, the storing step comprising the step of:

storing master contribution information for a first master in a rank of the buffer with master contribution information for a second master.

16. A debugging environment for generating master trace information for a write buffer, comprising:

a microcontroller, comprising:

a bus;

a memory coupled to the bus;

a plurality of masters to provide write data to the memory;

a write buffer coupled between the memory and the plurality of masters; and a plurality of master trace bits in the write buffer to indicate which of the plurality of masters contributed the write data; and a debugging tool coupled to a plurality of master pins of the microcontroller, the plurality of master pins being coupled to the plurality of master trace bits, wherein the plurality of master pins is equal in number to the plurality of master trace bits.

17. The debugging environment of claim 16, wherein the plurality of master trace bits are coupled to grant signals associated with the plurality of masters.

* * * * *

UNITED STATES PATENT AND TRADEMARK OFFICE
CERTIFICATE OF CORRECTION

PATENT NO. : 6,678,838 B1
DATED : January 13, 2004
INVENTOR(S) : James R. Magro It is certified that error appears in the above-identified patent and that said Letters Patent is hereby corrected as shown below:

<u>Column 13,</u>
Line 24, replace "tie" with -- the --

Signed and Sealed this

Fifteenth Day of June, 2004

JON W. DUDAS
*Acting Director of the United States Patent and Trademark Office*